United States Patent

Lankard et al.

[15] 3,640,737
[45] Feb. 8, 1972

[54] COMPOSITION FOR MARKING HOT METAL

[72] Inventors: David R. Lankard, Grandview Heights; Herbert D. Sheets, Jr., Columbus, both of Ohio

[73] Assignee: United States Steel Corporation, Pittsburgh, Pa.

[22] Filed: July 9, 1969

[21] Appl. No.: 840,225

Related U.S. Application Data

[63] Continuation-in-part of Ser. No. 612,783, Jan. 31, 1967, abandoned.

[52] U.S. Cl. ...................106/19, 106/71, 106/84, 106/308, 117/5.3, 117/105, 117/135.1, 117/169, 148/6.14
[51] Int. Cl. ...............C09d 11/00, C09d 13/00, C09d 1/02
[58] Field of Search ...........106/19, 20, 22, 23, 21, 71–74, 106/84, 84 M, 308 I, 38.3, 38.27; 148/6.14, 6.15; 117/12, 5.3, 105, 135.1, 169 A; 252/62.5, 62.1; 96/60–61

[56] References Cited

UNITED STATES PATENTS

| | | | |
|---|---|---|---|
| 1,698,302 | 1/1929 | Goss | 106/19 X |
| 1,744,116 | 1/1930 | Hannen et al. | 106/20 X |
| 1,942,763 | 1/1934 | Menshon | 106/84 X |
| 2,284,277 | 5/1942 | Gessler et al. | 106/20 |
| 2,284,279 | 5/1942 | Greubel | 106/20 |
| 2,711,974 | 6/1955 | Happe | 106/48 X |
| 3,107,591 | 10/1963 | Frankenhoff | 106/19 X |
| 3,207,624 | 9/1965 | Burrage et al. | 106/84 X |

*Primary Examiner*—Joan B. Evans
*Attorney*—Robert J. Leek, Jr.

[57] ABSTRACT

A liquid composition for marking metal products while at high temperature, by jet-spray application, comprises a pigment of metal oxide, such as titanium dioxide, in a vehicle of sodium-silicate solution containing kaolin as a suspending agent.

5 Claims, 1 Drawing Figure

PATENTED FEB 8 1972 3,640,737
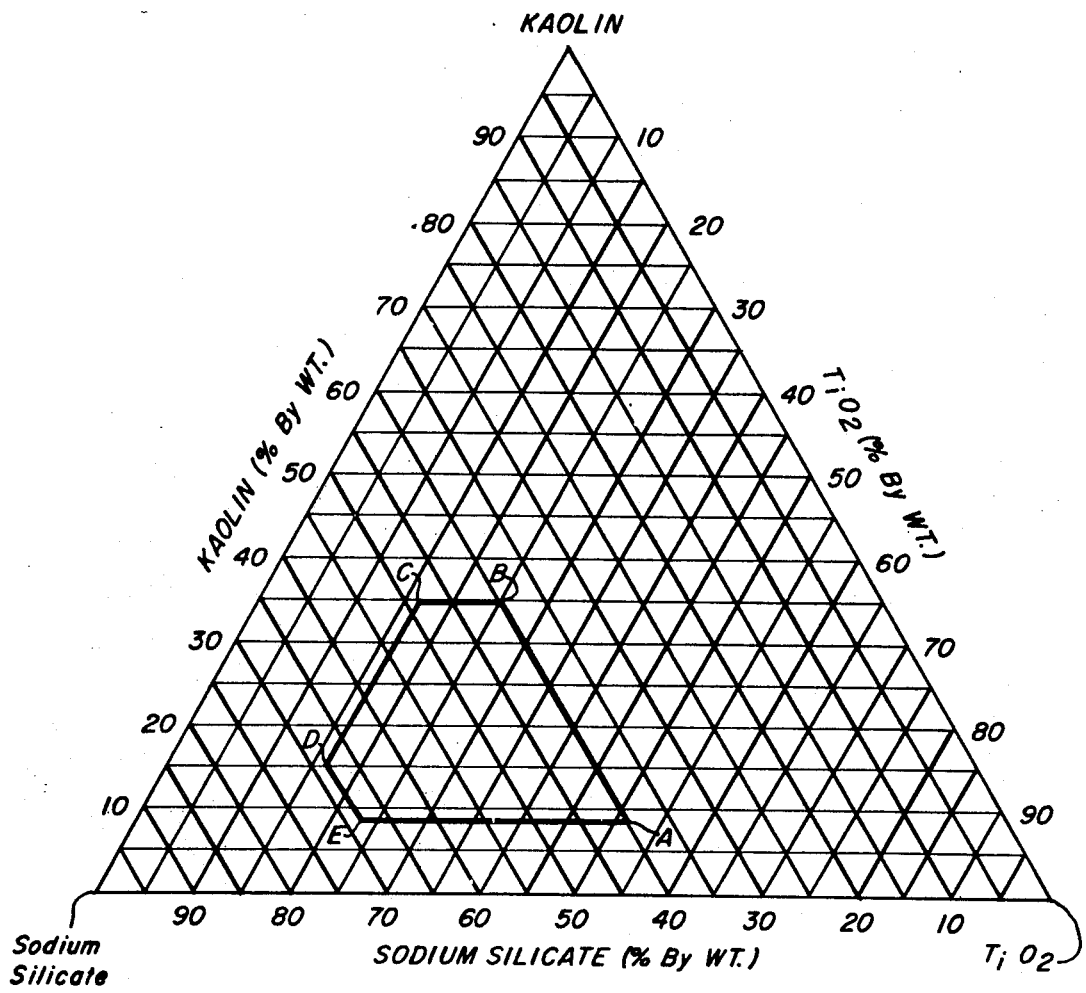
DAVID R. LANKARD
& HERBERT D. SHEETS JR.
By 
Attorney

COMPOSITION FOR MARKING HOT METAL

This application is a continuation in part of U.S. Pat. application Ser. No. 612,783, filed Jan. 31, 1967, by applicants and now abandoned.

This invention relates to marking composition suited for jet-spray application to hot metal products in the course of manufacture, in order to make possible subsequent identification thereof.

The most pertinent prior art known to us is Goss U.S. Pat. No. 1,698,302, Hannen et al. U.S. Pat. No. 1,744,166, and Happe U.S. Pat. No. 2,711,974.

The problem of marking metal products, such as steel plates or the like, while hot from rolling, has remained unsolved heretofore for lack of a marking material with the ability to stand up under the temperature of the product and which could be mechanically applied. Hand marking of hot plates is not desirable for safety reasons. It is not feasible, furthermore, to wait until the product has cooled to apply the marking. Mechanical marking means, settable from a distance, have been developed for this purpose and it is the object of our invention to provide a liquid which may be applied by such apparatus as a jet spray and which will afford a strongly adherent, readily legible and long-lasting mark by which the product may be quickly identified in subsequent processing or use.

For a better understanding of this invention, reference should be made to the accompanying drawing, wherein the sole figure is a ternary diagram showing the compositional range of solid constituents of the hot marking ink of the subject invention.

Our marking composition, in general terms, is an aqueous suspension of a metal oxide, e.g., titanium dioxide, in a sodium-silicate solution containing kaolin as a suspending agent. The titanium dioxide serves as a pigment and the kaolin-containing solution as the vehicle.

More specifically, the formula of our composition is as shown in the drawing and as follows:

|  | Parts by Weight |
| --- | --- |
| Titanium Dioxide | 16–52 |
| Kaolin | 8–35 |
| Sodium Silicate (solids) | 40–69 |
| Total Solids to Total | 100 | in coordinated amounts falling within the ranges defined by the area bounded by the line ABCDE in the accompanying drawing, with the total solids suspended in an amount of water between 59 to 263 parts providing said composition with a viscosity of 70 to 80 Krebs units at 20° C.

To be useful for purposes of the invention, a marking composition of unique characteristics is required and rigid performance requirements are imposed thereon. The marking composition must be liquid or liquid like so as to be free flowable and jet sprayable; its viscosity must permit jet spraying, yet at high temperatures (when contacting the hot metal product) it must not significantly bubble, should coalesce readily, and not spread or run to such an extent as to destroy legibility of its applied configuration (e.g., numerals or letters); and in addition the applied composition should dry and/or harden quickly to provide a strongly adherent weather-resistant marking. Only certain materials, and then in only limited and coordinated amounts, are useful to provide a marking composition of those requisite characteristics and balanced properties so as to be of utility for jet-spray application of legible markings to very hot meal products.

From the ternary diagram of the accompanying drawing, it can be noted that the line AB defines the lower limit of 40 percent and the line DE defines the upper limit of 69 percent for the sodium silicate solids content of the total solids content of the composition. The sodium silicate solids function to provide satisfactory adherence of the marking composition to the metal product. With less than 40 percent of the total solids being sodium silicate solids, there results an unsatisfactory and poor adherence of the marking composition to the metal product. When more than 69 percent of the total solids content is sodium silicate solids, the marking composition is insufficiently refractory in nature in that upon application it flows and melts so as to be detrimental to legibility. From the ternary diagram, it can noted that the line CD defines the lower limit of 16 percent for the titanium dioxide content of the total solids of the composition, and also that the point A defines the upper limit to be 52 percent for the titanium dioxide content of the total solids in the composition. With a marking composition's total solids containing less than 16 percent $TiO_2$, or other metal oxide pigment, the composition contains insufficient coloring pigment to provide a readily discernible and legible marking, and when containing $TiO_2$ as more than 52 percent of the total solids the composition's adherence is unsatisfactory. From the ternary diagram, it also can be noted that the line EA defines the lower limit of 8 percent for the kaolin content of the total solids and the line CB defines the upper limit of 35 percent for the kaolin content of the total solids in the marking composition. An amount of kaolin at least 8 percent of the total solids is necessary to serve as a suspending agent for the metal oxide, e.g., $TiO_2$. This amount of kaolin also serves to stabilize the viscosity of the marking composition, while held in a feed tank for subsequent jet-spray application, over a normally encountered 20° to 30° C., and somewhat higher temperature variance of the environment surrounding the feed tank in ordinary usage. When kaolin exceeds about 35 percent of the solids content, the amount of water requisite to provide the composition with a viscosity for jet-spray application is so large that such a composition upon hitting the hot metal splatters with a resulting loss of marking legibility. It should be readily apparent from the foregoing that there exists a unique interdependence and coordination of the metal oxide, kaolin, sodium silicate solids, and their amounts, as defined by the area bounded by the line ABCDE in the accompanying drawing, in order to provide a marking composition useful for the purpose taught herein.

In making a typical example, considered the preferred example of our composition, we mix about 4.8 pounds of finely ground titanium dioxide and about 1.2 pound kaolin in 1 gal. of a sodium silicate solution of about 50° Baumé (12.8 lb./gal.), containing about 44 percent solids by weight. Up to 0.25 gal. of water and the sodium silicate solution preferably are first blended together. The kaolin is then added and mixed so that all particles are wetted. Finally the titanium dioxide is added and the mixing is continued in a high-speed, high-shear propeller type mixer or Cowles Dissolver (Cowles Dissolver Co., Inc., Cayuga, N.Y. Model 1–VG) for from 15 to 25 minutes. The viscosity of the resulting overall composition then is reduced by adding a small amount of additional water, to assure a freely flowing characteristic in the requisite range for optimum spraying characteristics (about 70–80 Krebs units and preferably 75 Krebs units).

The solids content of the composition also is interdependent on the water content of the marking composition as the water content thereof chiefly controls the compsoition's viscosity. The lower limit of 70 Krebs unit for the viscosity of the marking composition is critical and is dictated in that compositions of lower viscosity bounce, splatter, and do not provide an initial adherence of the applied composition to the hot meal. The upper viscosity limit of about 80 Krebs units arises from a useful and practical basis in that present-day jet-spray equipment generally is not conducive to spraying more viscous compositions. It should be noted though that the composition must of necessity always contain some water content as some water is needed in the composition to promote and provide an initial adherence of the applied composition to the hot metal.

A preferred formulation of our composition is:

| Ink Constituents | Composition Parts by Weight |
| --- | --- |
| Titanium dioxide ($TiO_2$) | 41.2 |

| | |
|---|---|
| Kaolin | 10.3 |
| Sodium silicate aqueous solution (44.1% solids) | (48.5 solids<br>(61.5 $H_2O$ |
| Distilled Water | 18.9 |
| | 180.4 |

The titanium dioxide should be in a fine state of subdivision, i.e., commercially available pigment grade and suitably Type R 510 and its equivalent manufactured by E. I. du Pont de Nemours and Co., Wilmington, Del. Metal oxides other than titania may be substituted therefore, i.e., wollastonite ($CaSiO_3$), silica ($SiO_2$), alumina ($Al_2O_3$), beryllia (BeO), or zirconia ($ZrO_2$), with it contemplated that the useful amounts of each also will interdepend on the employed sodium silicate solids and kaolin and their amounts in a close approximation to the relationship taught herein for titanium dioxide, but not necessarily in the identical relationship, and with a useful marking being obtainable, but not necessarily the equivalent marking.

We find it desirable to use kaolin in a very fine form, i.e., an air-floated, chemically purified kaolin, because this grade of material is nonreactive with sodium-silicate and gives the composition a viscosity which remains quite stable over considerable periods of time regardless of temperatures changes. "Ajax P" kaolin, manufactured by Georgia Kaolin Company, Elizabeth, N.J., is a suitable product. In addition, this form of kaolin is highly effective as a suspending agent and thus prevents rapid settling of the pigment, titanium dioxide. The whiteness of the kaolin, furthermore, avoids any impairment of the reflectivity of the composition as applied, which is characteristic of the titanium dioxide. Any refractory clay in a suitable state of subdivision which is nonreactive with sodium silicate may be substituted for Ajax P kaolin.

Property data on the Ajax P kaolin is as follows:

PARTICLE SIZE ANALYSIS

| Equivalent Spherical Diameter, microns | Percent Finer by Weight |
|---|---|
| 5 | 100 |
| 2 | 96 |
| 1 | 84 |
| 0.5 | 60 |
| 0.3 | 39 |

TYPICAL CHEMICAL ANALYSIS

| Constituents | Parts by Weight |
|---|---|
| $SiO_2$ | 45.20 |
| $Al_2O_3$ | 38.08 |
| $Fe_2O_3$ | 0.49 |
| $TiO_2$ | 1.52 |
| CaO | 0.26 |
| MgO | 0.30 |
| $Na_2O$ | 0.02 |
| $K_2O$ | 0.04 |
| Loss on ignition | 13.51 |

| | |
|---|---|
| Pyrometric Cone Equivalent | 36 |

The sodium silicate used preferably has a 2:1 ratio of $SiO_2$ to $Na_2O$ by weight and suitably is manufactured by Philadelphia Quartz Co., Philadelphia, Penna.

Our composition, made as described above, is a smooth mixture, of paint consistency, which may be discharged under pressure through very small orifices without danger of plugging them. When an instantaneous jet spray thereof impinges on metal products at from 800° to 1,600° F., moreover, the individual droplets coalesce readily but do not spread or run to such an extent as to blur the outline of characters formed by stencils through which the spray is projected. By reason of the temperature of the product, furthermore, our liquid composition is quickly dried and hardened into a strongly adherent, weatherproof inscription.

Although we have disclosed herein the preferred embodiment and practice of our invention, we intend to cover as well any change or modification therein which may be made without departing from the spirit and scope of the invention as set forth in the claims.

We claim:

1. A marking composition suitable for jet-spray application of legible markings to hot metal products at temperatures between 800° to 1,600° F, which composition consists essentially of:
   a. solids of from about 16 to 52 parts by weight of metal oxide for use as a pigment, about 40 to 69 parts by weight of sodium silicate solution of about 50° Baumé, and having about a 2:1 ratio of $SiO_2$ to $Na_2O$ by weight to cause adherence of said metal oxide to said hot metal products, and about 8 to 35 parts by weight of kaolin as a suspending agent and stabilizer of viscosity, in coordinated amounts falling within the ranges defined by the area bounded by the line ABCDE in the accompanying drawing;
   b. said solids suspended in that amount of water between about 59 to 263 parts by weight providing said composition with a viscosity of about 70 to 80 Krebs units thereby eliminating splatter of said composition on said hot metal products and providing a sprayable composition which adheres to said hot metal products.

2. The marking composition defined by claim 1 wherein the metal oxide is titanium dioxide.

3. The marking composition defined by claim 1 wherein the metal oxide is titanium dioxide and the kaolin is present in the amount of about 1.25 pounds per gallon of solution.

4. The marking composition defined by claim 1 wherein the kaolin is air floated and the metal oxide is titanium dioxide.

5. The marking composition defined by claim 1 wherein the metal oxide is either titanium dioxide, wollastonite, silica, alumina, beryllia or zirconia.

* * * * *

UNITED STATES PATENT OFFICE
CERTIFICATE OF CORRECTION

Patent No. 3,640,737    Dated February 8, 1972

Inventor(s) David R. Lankard, et al

It is certified that error appears in the above-identified patent and that said Letters Patent are hereby corrected as shown below:

On the cover sheet [54] in the title, before "COMPOSITION" should read -- SILICEOUS --. Column 1, line 68, "meal" should read -- metal --.

Signed and sealed this 7th day of November 1972.

(SEAL)
Attest:

EDWARD M. FLETCHER, JR.
Attesting Officer

ROBERT GOTTSCHALK
Commissioner of Patents